United States Patent [19]

Jwo et al.

[11] Patent Number: 5,115,122
[45] Date of Patent: May 19, 1992

[54] COMPACT OPTICAL SCANNING SYSTEM

[75] Inventors: Chin-Hung Jwo; Paul S. Wu, both of Ithaca, N.Y.

[73] Assignee: NCR Corporation, Dayton, Ohio

[21] Appl. No.: 626,156

[22] Filed: Dec. 12, 1990

[51] Int. Cl.$^5$ .......................... G06K 7/10; G02B 26/08
[52] U.S. Cl. ...................................... 235/467; 235/462; 235/470; 359/196; 359/197
[58] Field of Search .............. 235/462, 467, 470, 472; 350/6.1, 6.5, 6.7, 566, 568, 567; 359/196, 197

[56] References Cited

U.S. PATENT DOCUMENTS

| | | | |
|---|---|---|---|
| D. 296,330 | 6/1988 | Davis et al. | D14/116 |
| D. 304,181 | 10/1989 | Kagayama et al. | D14/116 |
| 3,676,645 | 7/1972 | Fickenscher et al. | 235/61.11 E |
| 3,728,677 | 4/1973 | Munson | 340/146.3 F |
| 3,774,014 | 11/1973 | Berler | 235/61.11 E |
| 3,889,102 | 6/1975 | Dahlquist | 235/61.7 R |
| 4,064,390 | 12/1977 | Hildebrand et al. | 235/467 |
| 4,369,361 | 1/1983 | Swartz et al. | 235/470 |
| 4,652,732 | 3/1987 | Nickl | 235/462 |
| 4,731,623 | 3/1988 | Odo et al. | 350/6.7 |
| 4,766,298 | 8/1988 | Meyers | 235/462 |
| 4,795,224 | 1/1989 | Goto | 235/467 |
| 4,797,551 | 1/1989 | Ferrante | 250/234 |
| 4,938,551 | 6/1990 | Matsumoto | 235/467 |
| 4,941,719 | 7/1990 | Hisada et al. | 350/6.5 |
| 5,000,529 | 3/1991 | Katoh et al. | 235/467 |

Primary Examiner—Stuart S. Levy
Assistant Examiner—Tan Nguyen
Attorney, Agent, or Firm—Richard W. Lavin

[57] ABSTRACT

A portable, stand-alone compact optical scanning apparatus includes a housing member in which is mounted a printed circuit board, a semicircular mirror member mounted on the printed circuit board having a cone shaped edge portion, a light emitting element mounted on the mirror member for projecting scanning light beams within the housing member, a multifaceted rotating spinner mounted on said printed circuit board extending through said mirror member for directing the light beams at a plurality of pattern forming mirror members which reflect the light beams at the edge portion of the mirror member which in turn reflects the light beams through an aperture in the cover portion of the housing member, the scan pattern scanning a bar code label on a merchandise item positioned on top of the housing adjacent the aperture. A collection system is mounted on the mirror member for generating electrical signals in response to detecting the reflected light beams from the scanned bar code label.

5 Claims, 3 Drawing Sheets

COMPACT OPTICAL SCANNING SYSTEM

BACKGROUND OF THE INVENTION

The present invention relates to optical scanning systems and more particularly to a book size portable optical bar code scanning system which can be mounted on any type of supporting surface within a supermarket to provide a checkout operation.

In the present-day merchandising point-of-sale operations, data pertaining to the purchase of a merchandise item is obtained by reading data encoded indicia such as a bar code printed on the merchandise item. In order to standardize the bar codes used in various point-of-sale read out systems, the grocery industry has adopted a uniform product code (UPC) which is in the form of a bar code. Reading systems which have been constructed to read this bar code include hand-held scanners which are moved across a label bearing the bar code and stationary optical scanners normally located within the cabinet structure of a checkout counter, in which the bar code label is read when a purchased merchandise item and its associated label are moved across a window in the supporting surface of the counter constituting the scanning area of a counter, which movement is part of the process of loading the item into a baggage cart. There has arisen a need for a small book-size optical bar code scanner for generating a multiline scan pattern which can be mounted in either a vertical or a horizontal position on or in a checkout counter and which can be easily moved or carried to any location within a business establishment to provide a checkout operation at that location.

The background art known to the applicants at the time of the filing of this application includes: U.S. Pat. No. 4,766,298 which discloses a low-profile portable UPC optical scanner including a housing member in which is mounted on the floor portion of the housing member a light emitting element for projecting scanning light beams within the housing member and a floor-mounted multifaceted rotating mirror for directing the light beams at a plurality of floor-mounted twisted mirror members which reflect the light beams through an aperture in the cover portion of the housing member, and U.S. Pat. No. 4,797,551 which discloses a compact optical scanning system which includes a housing member having a laser member mounted therein whose coherent light beam output is reflected along a shelf extending between opposite side walls of the housing member. The laser beam is directed at a mirror mounted on the shelf which reflects the laser beam at a multifaceted rotating spinner mounted on the floor of the housing member directly beneath the shelf. The rotating spinner directs the laser beam at a plurality of pattern mirrors mounted on the floor of the housing member which reflect the light beams in the form of a scan pattern through an aperture in the cover of the housing member.

SUMMARY OF THE INVENTION

A compact optical scanning system is provided which comprises a portable book-size housing member having a cover portion which includes a glass enclosed aperture over which a UPC label attached to a purchased merchandise item is moved. Mounted on the floor of the housing member is a printed circuit board on which is mounted a semicircular reflecting mirror having a cone shaped edge. Mounted on the cone shaped edge is a source of laser light beams comprising a laser diode. Rotatably secured to a motor mounted on the printed circuit board is a multifaceted spinner which receives the scanning light beams from the laser diode and reflects the light beams at a plurality of pattern forming mirrors which are secured at a predetermined angle to the cover portion of the housing member. The pattern forming mirrors will reflect the light beams back in a downward direction at the curved cone shaped edge surface of the reflecting mirror which reflects the light beams in a direction upward at a predetermined angle through the aperture in the form of a scanning pattern for scanning a bar code label positioned adjacent the aperture.

It is therefore a principal object of this invention to provide a book-size optical scanning system which can be placed on a supporting structure in either a vertical or horizontal position for processing merchandise items which are moved past the scanning system.

It is another object of this invention to provide an optical scanning system mounted within a book-size enclosure for generating a multiline scan pattern.

It is another object of this invention to provide a portable book-size scanning system which has a depth of three inches and which is low in cost.

BRIEF DESCRIPTION OF THE DRAWINGS

These and other objects, features and advantages of the invention, as well as the invention itself, will become more apparent to those skilled in the art in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
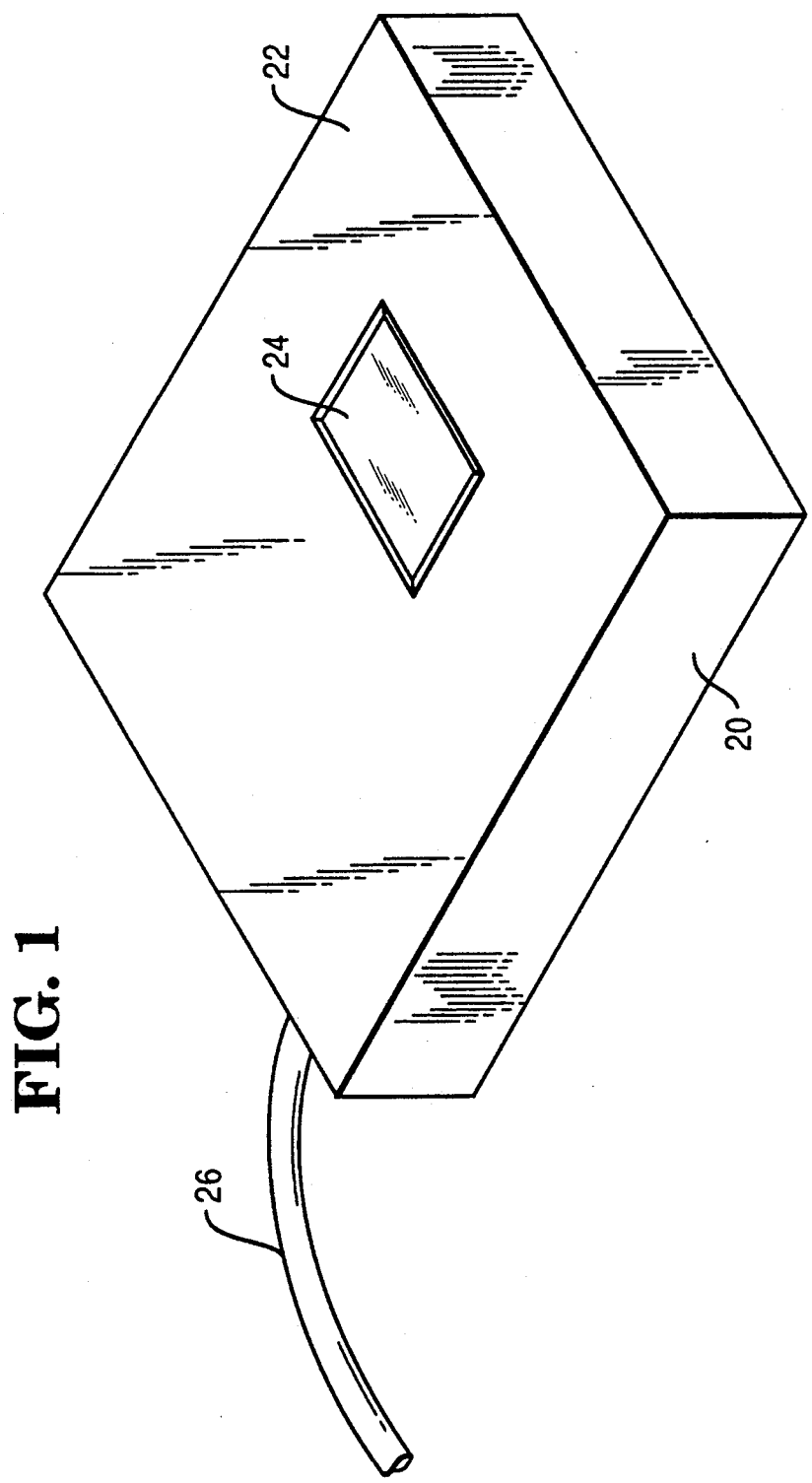
FIG. 1 is a perspective view of the compact optical scanner of the present invention showing the location of the scanning aperture together with a cable which supplies power to the scanner and also transmits electrical signals to a remote processing unit for use in obtaining the price of the merchandise item whose bar code label has been scanned.

Referring now to FIG. 1, there is shown a perspective view of the optical scanner of the present invention which includes a box like-housing member 20 which in the present embodiment is 8 inches wide, 11 inches long and 3 inches in height. Located in the cover portion 22 of the housing member 20 is a scanning window 24 through which scanning light beams are projected. Extending from the housing member 20 is a cable member 26 over which power signals are transmitted from a power source (not shown) and over which decoded data, pertaining to the data represented by the bar code on the bar code label, is transmitted to a remote processor for use in obtaining the price of the merchandise item to which the bar code label pertains.

Figure 2:
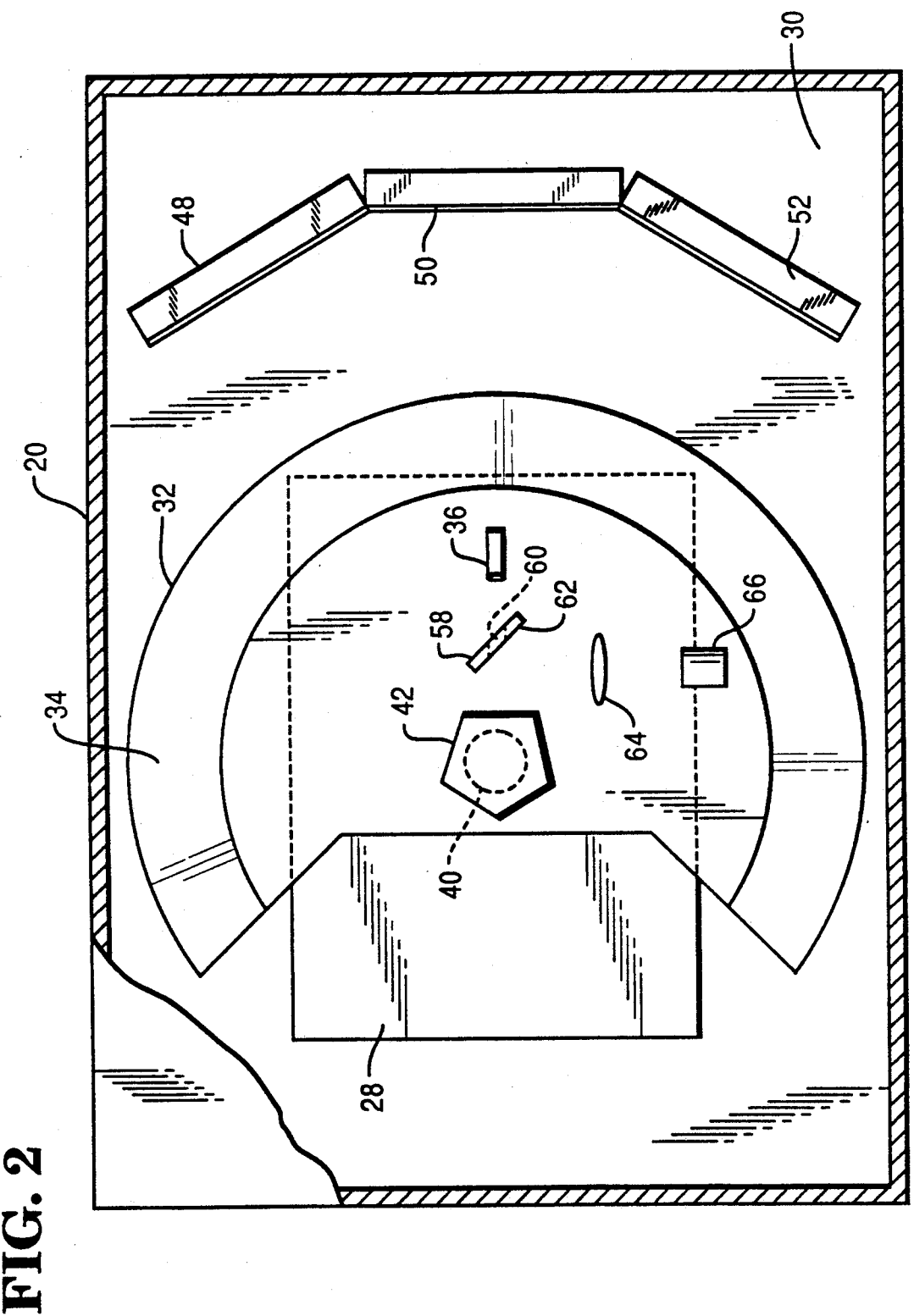
FIG. 2 is a top view of the compact optical scanner with a portion of the cover of the scanner removed showing the location of the rotating multifaceted scanner and the pattern forming mirrors.
Figure 3:
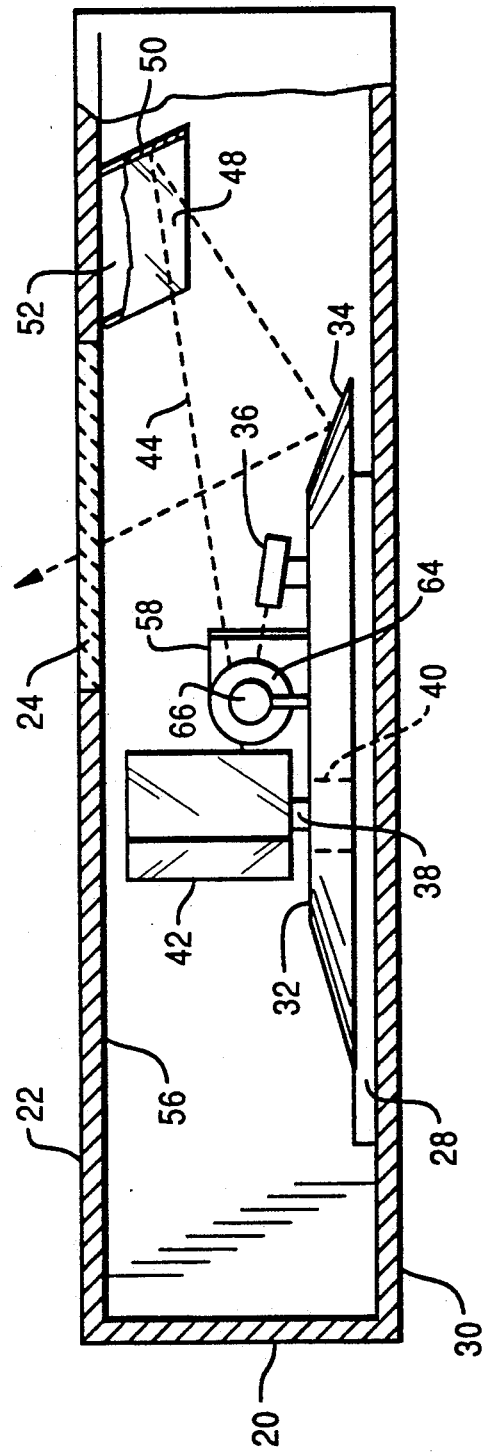
FIG. 3 is a side view of the compact optical scanner with a portion of the side wall removed showing the light path of the scanning light beams.

Referring now to FIG. 2, there is shown a top view of the optical scanner with the cover portion 22 removed which optical scanner includes a printed circuit board 28 mounted on the floor portion 30 of the scanning apparatus 20. Mounted on the printed circuit board 28 is a semicircular reflecting mirror member 32 (FIG. 3) having a curved cone shaped edge portion 34 on which is mounted a laser diode 36. Rotatably mounted on the drive shaft 38 of a motor 40 secured to the printed circuit board 28 and extending through the mirror member 32 is a five sided multifaceted spinner member 42 which receives the laser light beam projected along the beam axis 44 (FIG. 3) from the laser diode 36 which is oriented in a slightly upward direction towards the spinner member 42 as shown in FIG. 3. Secured to the under surface 55 of the cover portion 22 are three pattern forming mirror members 48-52 inclusive. Mounted on the mirror member 32 is a collection system which includes a mirror member 58 having an aperture 60 through which the scanning light beams from the laser diode 36 are projected. The mirror member 58 has a side portion 62 which is coated with a silver coating to reflect the reflected light beams from the scanned coded label at a collection lens member 64 mounted on the mirror member 32. The lens member 64 focuses the light beams at a photodetector 66 mounted on the mirror member 32 which generates electrical signals in response to receiving the reflected light beams in a manner that is well known in the art.

Figure 4:
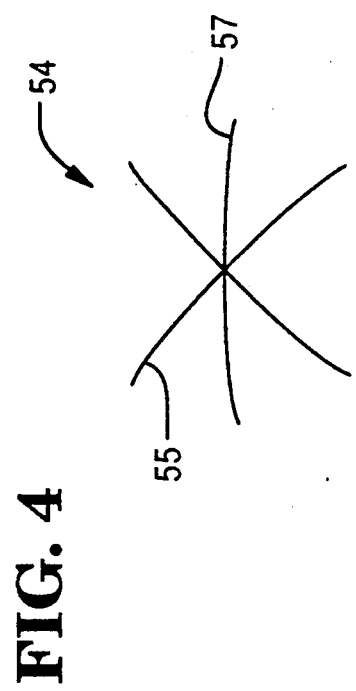
FIG. 4 is a top view of the curved lines of the scan pattern.

In the operation of the scanning device, the laser diode 36 will output scanning light beams along the beam axis 44 towards the spinner 42 which reflects the scanning light beams at the pattern forming mirror members 48-52 inclusive. The reflecting mirror members 48 and 52 will reflect the light beams at the cone shaped edge portion 34 of the semicircular mirror member 32 which in turn reflects the light beams through the window 24 in the form of the scan pattern 54 (FIG. 4) for scanning a bar code label positioned adjacent the window.

The use of the cone shaped edge portion 34 provides the mirror member 32 with a curved surface which will expand the projection of the light beams received from the mirror members 48 and 52. This produces the length of the scan lines which comprise the scan pattern 54 while still retaining the limited height of the housing member 20. The presence of the cone shaped surface of the mirror 32 will reflect the light beams at a predetermined angle to the horizontal surface of the aperture 24 which is critical to the generation of the curved scan lines 55, 57 (FIG. 4) of the scan pattern 54.

The light beams reflected from the mirror members 48, 52 forming the X portion of the scan pattern comprising the scan lines 55 will be projected at an angle of 54.74 degrees. The light beams reflected from the mirror member 50 forming the scan line 57 are projected through the aperture 24 at an angle of 35.3 degrees. The formation of the scan pattern 54 is also determined by the angle to which the reflecting mirror members 48-52 inclusive are mounted to the undersurface 56 of the cover portion 22. In the present embodiment, the mirror members 48-52 inclusive are mounted at a 45 degree angle to the undersurface 56 of the cover portion 22.

The light beams reflected from the bar code label on the merchandise item are directed back through the window 24, the mirror members 48-52 inclusive and one of the facets of the spinner member 42 towards the silvered side 62 of the mirror member 58. The side 62 of the mirror member 58 will reflect the light beams towards the lens member 64 which focuses the light beams at the photodetector 66. As is well known in the art, the bar code label comprises a plurality of light and dark bars (not shown) printed on a label which, when scanned by the scanning apparatus, will generate a specific pulse wave-form. The photodetector 66 will, in response to receiving the changes in the light intensity of the reflected light beams, generate electrical signals which are transmitted to the printed circuit board 28 (FIG. 2) where an A/D converter (not shown) will digitize the analog signals after which logic circuits on the circuit board 28 will process the digitize signals received and transmit the signals to a remote data terminal device (not shown) where the information is displayed over the cable 26. It will thus be seen that there is disclosed a compact optical scanner which allows a checkout operation to occur on any supporting surface in a business establishment.

Although the preferred embodiment of the present invention has been described herein, it is not intended that the invention be restricted thereto but that it be limited only by the true spirit and scope of the appended claims.

What is claimed is:

1. In an optical scanning system, an optical scanning apparatus for reading bar code symbols on objects passing adjacent the scanning apparatus comprising:

a housing member which includes a cover portion having an aperture therein through which scanning light beams are projected and a floor portion;

support means mounted on the floor portion of the housing member;

a semicircular shaped mirror member mounted on said support means for reflecting light beams through the aperture in the form of a scanning pattern;

a source of light beams mounted on said mirror member for directing light beams along a first light path;

scanning means mounted on said support means and extending through said mirror member and into said first light path for cyclically sweeping the light beams along a second light path; and reflecting means secured to the interior surface of said cover portion and in said second light path for reflecting the light beams along a third light path; said mirror member including a reflecting portion comprising a cone-shaped edge portion of the mirror member mounted in said third light path for reflecting light beams through said aperture in the cover portion for scanning a bar code label positioned adjacent said aperture.

2. The check out apparatus of claim 1 in which said support means comprises a printed circuit board.

3. The scanning apparatus of claim 2 in which said scanning means further includes a multifaceted mirror member rotatably mounted on said printed circuit board and in said first light path and drive means mounted on said printed circuit board and engaging said multifaceted mirror member for rotating said multifaceted member whereby said multifaceted member will reflect light beams along said second light path.

4. The scanning apparatus of claim 1 in which said mirror member is mounted adjacent the aperture wherein said curved surface will reflect the light beams at an angle to the top surface of the aperture enabling the scan pattern to be formed.

5. The scanning apparatus of claim 1 in which said mirror member includes a circular portion in which is located said curved surface for reflecting the light beams through said aperture.

* * * * *